United States Patent [19]

Enneper et al.

[11] Patent Number: 5,168,736
[45] Date of Patent: Dec. 8, 1992

[54] CRIMPING MACHINE

[75] Inventors: Klaus Enneper, Radevormwald; Dirk Monsieur, Solingen; Eckbert Schwager, Wuppertal, all of Fed. Rep. of Germany

[73] Assignee: Kabelwerke Reinshagen GmbH, Fed. Rep. of Germany

[21] Appl. No.: 708,081

[22] Filed: May 24, 1991

Related U.S. Application Data

[63] Continuation of Ser. No. 440,595, Nov. 22, 1989, abandoned.

[30] Foreign Application Priority Data

Nov. 22, 1988 [DE] Fed. Rep. of Germany ....... 3839357
Dec. 14, 1988 [DE] Fed. Rep. of Germany ....... 3842009

[51] Int. Cl.⁵ .................................................. H01R 43/04
[52] U.S. Cl. .............................................. 72/4; 72/26; 29/705; 29/715
[58] Field of Search ............... 29/705, 707, 593, 715, 29/716, 714, 709, 753; 72/4, 26, 21, 19

[56] References Cited

U.S. PATENT DOCUMENTS

| | | | |
|---|---|---|---|
| 3,665,742 | 5/1972 | Felt | 72/4 |
| 3,859,708 | 1/1975 | Keim | 29/715 |
| 4,010,679 | 3/1977 | Dybel | 72/26 |
| 4,023,044 | 5/1977 | Miller | 72/4 |
| 4,218,817 | 8/1980 | Takano | 29/715 |
| 4,294,006 | 10/1981 | Bair | 29/707 |
| 4,552,002 | 11/1985 | Haenni | 72/19 |
| 4,856,186 | 8/1989 | Yeomans | 29/705 |

FOREIGN PATENT DOCUMENTS 246579 12/1985 Japan ........................... 29/705

OTHER PUBLICATIONS

Goeller, J. E., et al, "Terminal Crimp Pressure Detector" from *IBM Technical Disclosure Bulletin*, vol. 27, No. 7A, Dec., 1984, pp. 3827, 3828.

*Primary Examiner*—Daniel C. Crane
*Attorney, Agent, or Firm*—Reising, Ethington, Barnard, Perry & Milton

[57] ABSTRACT

A crimping machine is disclosed for making a crimp connection of an electrical connector with an electrical conductor. A fixed tool receives the connector with crimpable prongs in a position for receiving the electrical conductor therebetween. A movable tool crimps the prongs against the conductor by a reciprocating stroke and a strain gage senses the force transmitted between the tools. A control device responds to a predetermined value of force for terminating the crimping stroke and measuring means measures the length of the crimping stroke. Indicating means indicates when the length of the stroke of the movable tool deviates from a predetermined stroke length as an indication of a defective crimp connection.

7 Claims, 5 Drawing Sheets

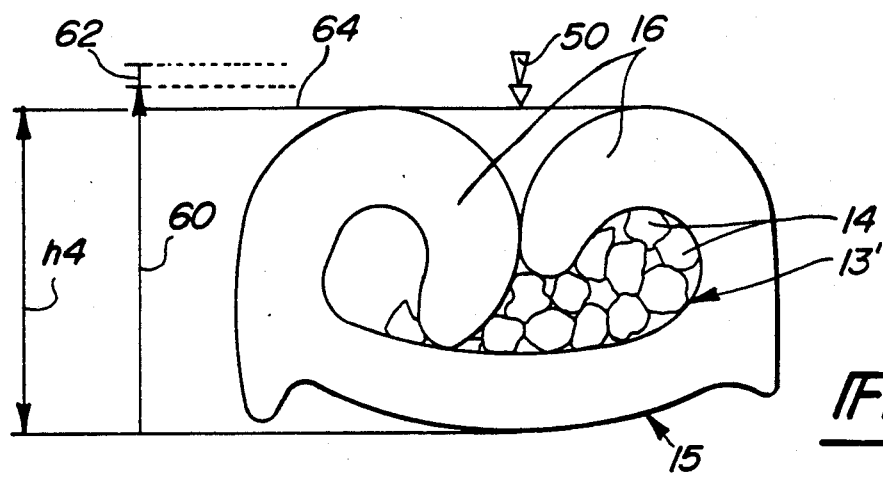
_Fig-4_
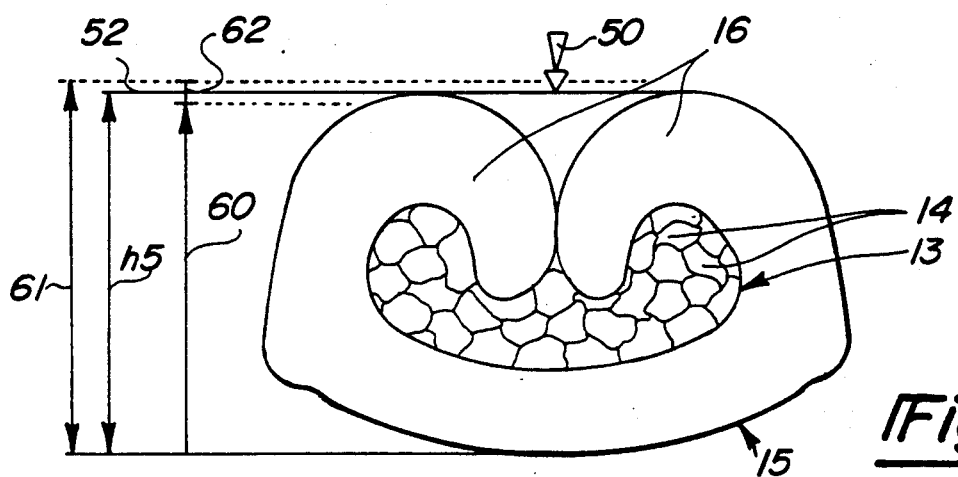
_Fig-5_
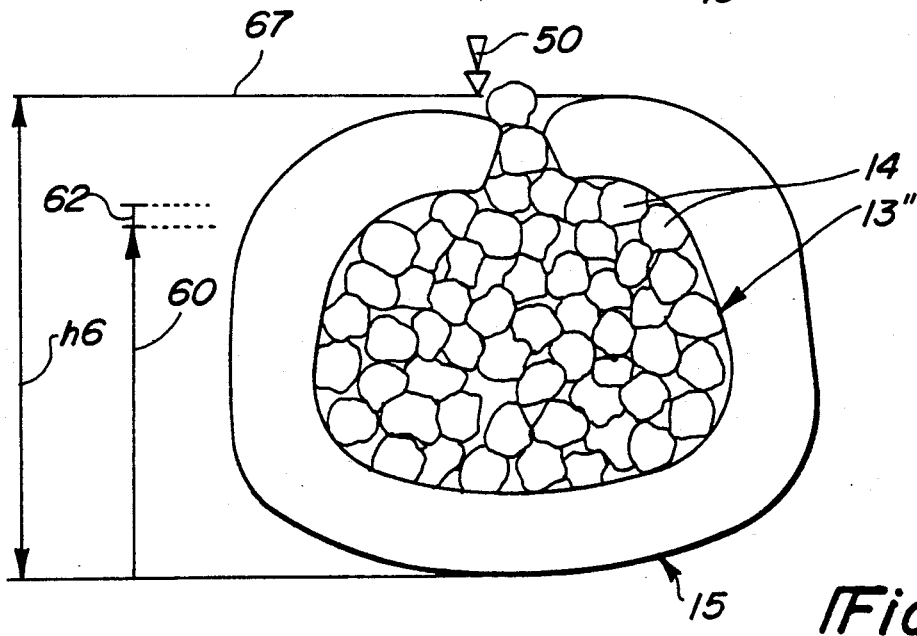
_Fig-6_

CRIMPING MACHINE

This application is a continuation of application Ser. No. 440,595, filed Nov. 22, 1989, now abandoned.

FIELD OF THE INVENTION

This invention relates to crimping machines; more particularly, it relates to machines for making a crimp connection of an electrical conductor with an electrical connector having crimpable prongs.

BACKGROUND OF THE INVENTION

Manufacturing apparatus is already known for making a crimp connection on a high production basis, between an electrical conductor and an electrical connector having crimpable prongs. In one known apparatus, described in German patent DE AS 19 22 557, a force measuring means or dynamometer is used with an electronic control circuit for limiting the crimping force to a preset value. This arrangement does not provide the desired degree of quality control of the crimp connection because variations in the material of the crimpable prongs result in different crimp height, i.e. the dimensions of the crimped connection.

A general object of this invention is to provide an improved crimping machine which overcomes certain disadvantages of the prior art.

SUMMARY OF THE INVENTION

In accordance with this invention, an improved crimping apparatus is provided for making crimp connections of a conductor and a connector and which will provide an indication of crimped connections which are defective. This is accomplished by providing indication of an out-of-tolerance dimension of the crimped connection when it is formed by a predetermined crimping force between the crimping tools.

Further, in accordance with this invention, an apparatus for making a crimp connection comprises a fixed tool for receiving an electrical connector with crimpable prongs and a movable tool for crimping the prongs against a conductor by a reciprocating stroke. Means responsive to a predetermined value of the force transmitted between the tools terminates the crimping stroke of the movable tool. Measuring means is provided for measuring the length of the crimping stroke of the movable tool and indicating means indicates when the length of the stroke deviates from a predetermined stroke length as an indication of a defective crimp connection.

A complete understanding of this invention may be obtained from the detailed description that follows taken with the accompanying drawings.

DESCRIPTION OF THE DRAWINGS

FIGS. 4 to 10 show in considerable enlargement cross-sectional views through finished crimp connections of varying quality, of which FIGS. 5 and 8, as comparative representations, reproduce a proper crimp connection in each case.

BEST MODE FOR CARRYING OUT THE INVENTION

Figure 1:
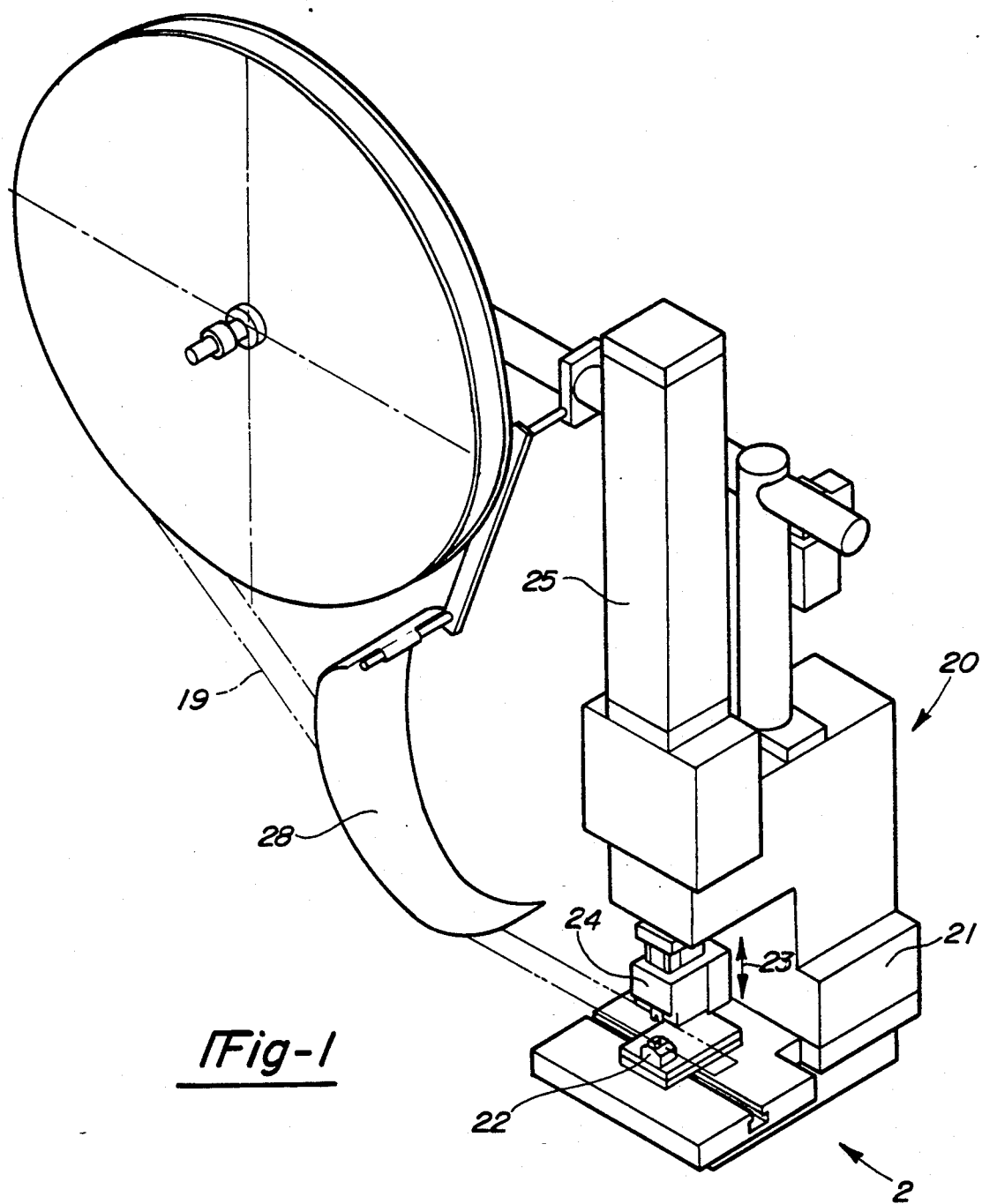
FIG. 1 shows in perspective view the structure of the mechanical part of the apparatus according to the invention, FIGS. 2, a, b and c shows in perspective view the different work phases involved in executing a crimp connection.

Referring now to the drawings, there is shown an illustrative embodiment of the invention in a crimping machine which is especially adapted for making a crimp connection between an electrical conductor and an electrical connector having crimpable prongs. The machine in the illustrative embodiment is adapted for making crimped connections on a high volume basis of manufacturing with quality control incorporated into the machine. It will be appreciated as the description proceeds, that the invention is applicable to other crimped connections and may be realized in many different forms.

Figure 2:
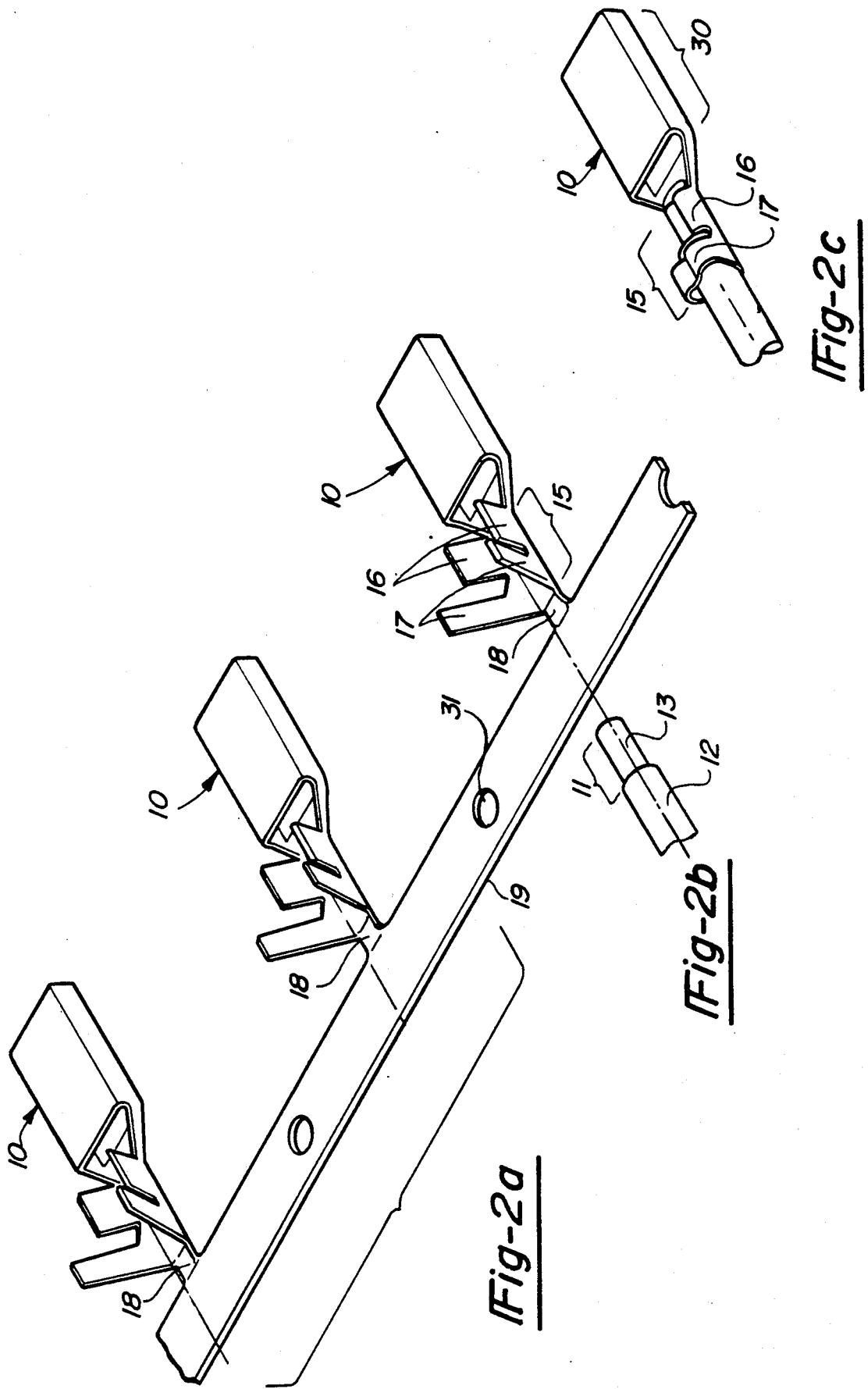

The apparatus of the invention is adapted to produce the product shown in FIG. 2c, which comprises a connector or joining element 10, which is crimped on the end 11 of an electrical lead 12. The electrical lead 12 preferably consists of an electrical conductor 13 with a multiplicity of strands 14, as is especially well understood from the enlarged cross-sectional view of FIG. 5. Moreover, the end 11 of the lead 12 is stripped. The joining element 10 comprises a connection piece 15 with crimpable prongs 16 for the electrical contacting of the conductor 13, and it suitably comprises additional clamps 17 for strain relief, which can be pinched onto the insulation of the electrical lead 12. Such a final position of the prongs and clamps is shown in FIG. 2c.

The joining elements 10 are mounted by respective unitary webs or cross-pieces 18 on a continuous belt 19, which, according to FIG. 1, is fed by a supply roll coming from the apparatus 20. The present case involves the joining element 10 having a connection piece 15 and female connector or coupling-half 30 according to FIG. 2c.

The apparatus 20 comprises a lower tool 22 mounted stationary in a base 21 as well as an upper tool 24 opposite it, executing a stroke movement 23. The stroke drive 25, which can be of any type, in this case consists of a piston-cylinder arrangement 25 powered by compressed air through the compressed-air tubing 26 schematically shown in FIG. 3, the piston of which determines the stroke movement 23 of a plunger or ram 27 shown in FIG. 3.

Figure 3:
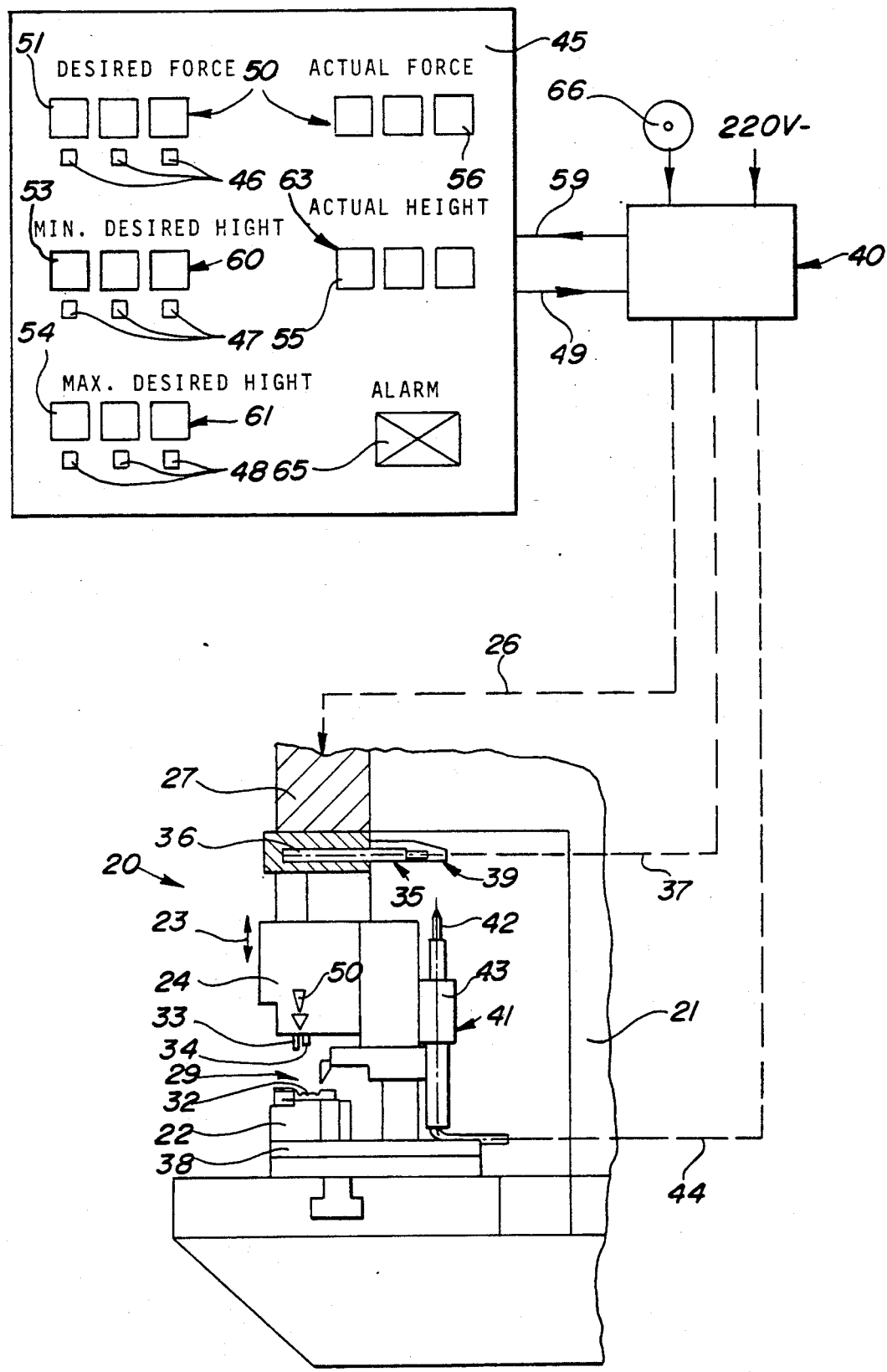
FIG. 3 shows, partially in section and in cut-away, a lateral view of the apparatus in the direction of arrow 2 of FIG. 1 with an accompanying evaluation device and its reproduced input as well as an indication device in not-to-scale arrangement.

The belt 19 with a system of joining elements 10 is continuously fed over guide surface 28 according to FIG. 1 to the crimp site 29 indicated in FIG. 3 between the two tools 22, 24. In the lower tool 22, the crimp site 29 is provided with a male forming die 37. A male forming die 34 in the upper tool coacts with the die 32 for an adjusting the position of the prongs 16 and the clamps 17 in the crimping operation resulting from the stroke movement 23. Cutting dies 33, which simultaneously with the crimping severs the cross-piece 18 of each joining element 10 situated on the crimp site 29.

Figure 8:
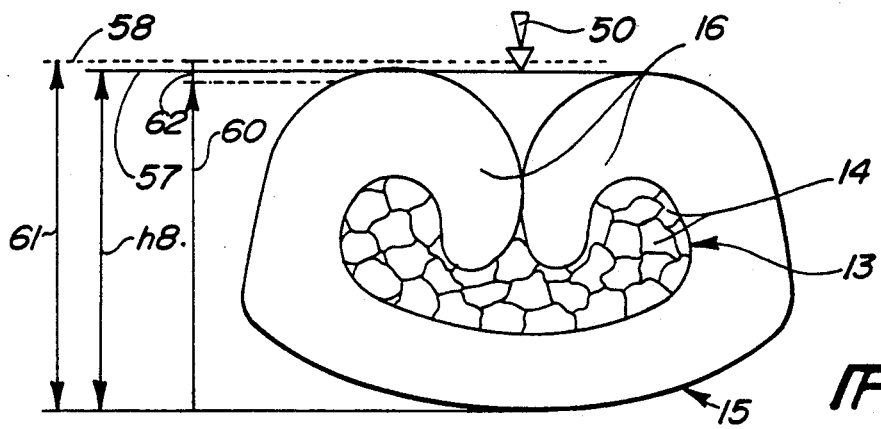

First of all, the upper tool 24 is situated in its upper or retracted position of its stroke movement 23 as is evident from FIGS. 1 and 3, while the belt 19 is brought into the aligning position of a joining element 10 on the crimp site 29 by using drive means being applied in 31. Then, the stripped end of the lead 12 with a bundle of strands mentioned above in the direction of the axis line as is evident from FIG. 2b is brought into the region of the said connection piece 15. The stroke movement 23 is then released, by means of which the clamps 17 and prongs 16 are formed into the crimp connection of the joining element 10 described above in connection with FIG. 2c. FIGS. 5 and 8 show in considerable enlargement the cross-sectional view through the connection piece with the prongs 16 folded in a proper manner around a complete bundle 13 of lead strands 14. As a result, it is emphasized that a crimping height h5 or h8 is obtained in each case.

As is evident from the schematic representation of FIG. 3, the apparatus 20 comprises a force measuring means or dynamometer 35, the sensor 36 of which in the present case is mounted in the stroke gear, i.e., in the midst of the plunger or ram 27 and with its instrument lead 37 leads to an evaluation or measuring device 40 of the apparatus 20 according to the invention. However, as an alternative it would also be possible to mount such a sensor 36 in the region of the lower tool 22 and especially in the region of the abutment 38 leading to the base 21. Such a sensor 36 can consist of a known primary element, such as, e.g. a wire strain gauge or a measuring tape bridge circuit.

However, the apparatus 20 according to the invention also comprises a length measuring device 41, the primary element 42 of which projects into the stroke-movement path 23 of a measuring edge 39 provided on the upper tool 24, which is formed here as a bracket on the plunger 27 and in this case presses the primary element designed as a pin 42 into the interior of a measuring receiver 43. Starting at the fully extended starting position of the pin 42 whose dipping movement is, e.g., on a capacitive path, the measuring receiver 43 determines and sends via the instrument lead 44 the measurement signal to the evaluation device 40.

The evaluation or measuring device 40 is provided with a control panel 45, represented schematically which has three keypads 46,47,48, which feed the evaluation device 40 with three different, predetermined values through the conductor 49. In the present case, each keypad has three keys, which in a decimal manner selects decimal value of the one, ten and hundred digit of a three-digit value. It is obvious that a known adjusting knob could also be used for this.

The first value to be set by the keypad 46 is the desired final value 50 of the force to be exerted between the upper tool 24 and the lower tool 22 as indicated by the arrow 50 in FIG. 3, 5 or 8, which is known to be adequate for a satisfactory crimping of proper components and conditions according to FIGS. 5 and 8. The set final value 50 indicated in a digital read-out in field 51 of the control panel 45. The value of force is monitored by the dynamometer 35. If the desired force is reached in the stroke movement 23, the evaluation device 40 ends the downward stroke of the upper tool 24 via the above-mentioned signal line 26, by which, in the case of FIG. 5, the lower arrest point of the stroke movement in this case results on the height line 52 and activates the return stroke of the stroke movement 23. Thus, the above-mentioned crimping height h5 is obtained.

The additional keypads 47,48 serve to set both a minimum and a maximum permissible desired value 60,61 of the crimping height that can be tolerated. This tolerance range 62 is represented in FIG. 5 by a distance, which, in the accepted ideal case, projects from the proper crimping height h5 upwards and downwards. These set desired values 60,61 are presented in digital read-out via corresponding indication fields 53,54 and are also made available to the evaluation device 40 via the indicated trip line 49.

In the ideal case of FIG. 5, the crimping height h5 is determined by the length measuring device 41 at the moment of the lower arrest point 52 of the stroke movement and is led via the trip line 59 from the evaluation device 40 to the control panel 45 and presented in the read-out in field 55 as the actual value 63. At the same time, the value 50 of the crimping force 50 reached in the stroke arrest point is also indicated via the signal line 59 for control, for which there is the read-out field 56 shown in FIG. 3.

In the accepted ideal case of FIG. 5, the determined actual value h5 of the crimping height lies within the tolerance range 62, and therefore, the apparatus 20 continues to run cyclically so as to continually feed the next joining element 10 of the belt 19 to the crimp site 29. In the stroke movement 23, the case evident from FIG. 8 may occur, where the above-mentioned desired final value 50 of the crimping force this time results in the height 57, as the lower arrest point of the upper tool 24. As is evident from FIG. 8, this height 57 lies closer to the maximum permissible crimping height 58 determined by the set maximum desired value 61, and yet this value also still lies within the tolerance range 62, and therefore, the crimp connection in this case is also detected by the evaluation device 40 as "proper" and is accepted.

In the case of FIG. 4, a case is accepted in which several lead strands 14 were inadvertently cut off in the stripping of the accompanying electrical lead 12, such that there is now an essentially slimmer bundle 13'. The final value 50 of the preset crimping force is first reached at the reduced height 64, and an actual value h 4 of the crimping height is also measured, which lies below the tolerance range 62. The crimp connection according to FIG. 4 is detected by the evaluation device 40 as being defective and the defect is indicated by an alarm display 65 of the control panel 45. In addition, acoustic signals can also be emitted by the evaluation device 40. At the same time, the supply lead 66 for compressed air is appropriately switched off by the evaluation device 40, such that the further operation of the apparatus 20 is interrupted. The lead 12 provided with a defective application of the joining element 10 is now removed from the device. This could occur in further automation of the apparatus by means of a gripping tool, which grips the defective product and discards it. The apparatus 20 could then be automatically switched on again.

FIG. 6 shows an alternative case, where there is a bundle 13" of strands 14 which is too thick and the preset final value 50 of the crimping force is reached at a much higher position 67 of the stroke movement, by means of which simultaneously the length measuring device determines the accompanying crimping height h6. This clearly lies above the permissible tolerance range 62 and therefore is also detected by the evaluation device 40 as a defective application and is evaluated in the above-mentioned manner.

Figure 9:
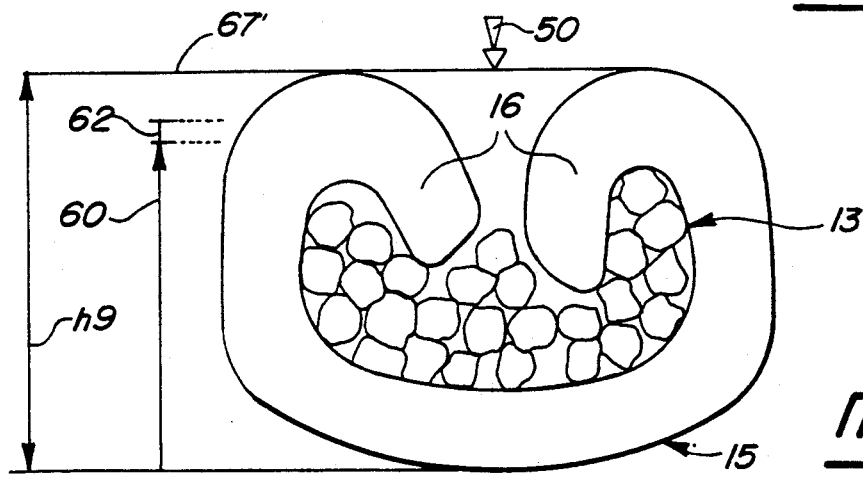
Figure 10:
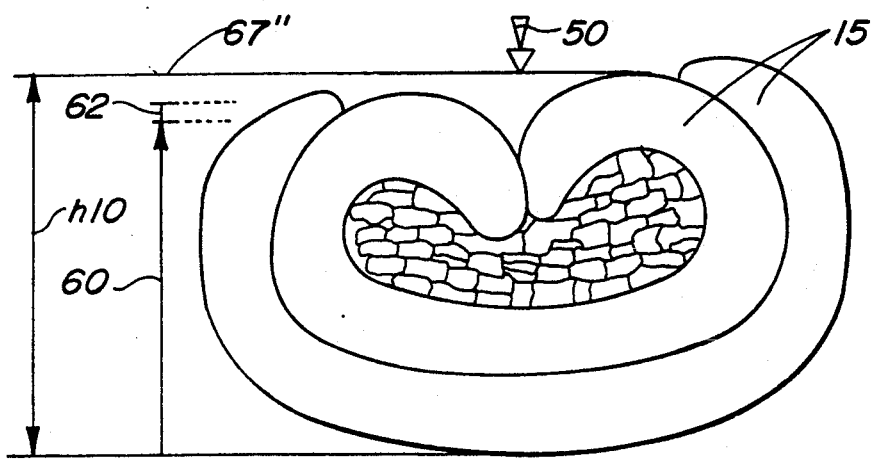

A corresponding situation also results in the cases evident from FIGS. 9 and 10, where lower arrest points 67' and 67" are obtained which are too high compared to the tolerance range 62, because the final value 50 of the crimping force is prematurely reached. In the case of FIG. 9, this may have to do with the fact that the material of the connection piece 15 to be crimped was too hard or its plate wall thickness is too thick, such that the prongs do not suitably close around the bundle 13 of strands 14. In the case of FIG. 10, two connection pieces 15 are inadvertently superimposed by a fault in the element feed. This is also detected by the evaluation device 40, because the actual value h10 of the crimping height is too high.

Figure 7:
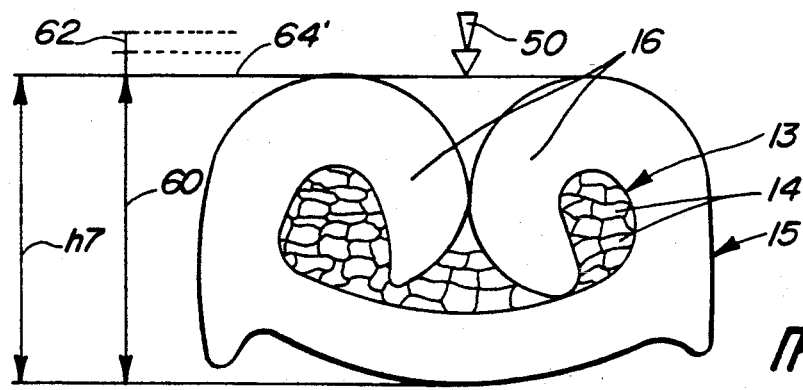

In the case of FIG. 7, a case comparable to FIG. 4 is again illustrated, which occurs by means of an excess pressing of the bundle 13 of lead strands 14. In this case, this may be substantiated in that the material was too soft for the prongs 16 or the plate thickness was too thin, and thus, the set final value 50 of the crimping force is first reached at the height 64'. The then measured crimping height h7 lies below the permissible tolerance range 62, which is detected by the evaluation device 40 as an error and is evaluated in the above-mentioned manner.

It is obvious that the mechanical structure and the function of the apparatus 20 and its tools 24, 22 as well as its stroke drive 25 could be realized by other designs. Instead of the minimum and maximum desired values 60, 61 of the crimping height, one could also input an average desired value, including the permissible tolerance deviation upwards and downwards. As was already mentioned, sensors 36, 42 for the measurement of force and length of any type could be used. Instead of a length measurement only in the direction of the stroke movement 23 of both tools 22, 24 to one another, one could also additionally use sloping measurement directions, insofar as, due to the given shape of the prongs 16, the sensitivity is given for the proper folding in of the prongs. In the extreme case, this could also be done in the transverse direction to the stroke movement 23. The final value 50 of the crimping force is selected such that the tools 24,22 are not damaged in the case of the described defects in the connection of joining elements.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In an apparatus for making a crimp connection of an electrical connector having crimpable prongs to an electrical conductor, said apparatus being of the type comprising,
   a fixed tool for receiving an electrical connector with its crimpable prongs in a position for receiving an electrical conductor therebetween and for being crimped against said conductor,
   a movable tool for crimping said prongs against said conductor by a reciprocating stroke which exerts an increasing crimping force against the crimpable prongs during the stroke movement of said movable tool toward said fixed tool, said force being transmitted between said tools,
   and force measuring means for measuring said force which is transmitted between said tools, the improvement which comprises:
   means responsive to a predetermined value of said increasing crimping force for terminating the crimping stroke of the movable tool,
   stoke measuring means for measuring the length of the crimping stroke of said movable tool,
   and indicating means for indicating when the length of the stroke of said movable tool deviates from a predetermined stroke length by more than a predetermined tolerance.

2. The apparatus defined by claim 1 including means responsive to said stroke measuring means for stopping operation of the apparatus when said deviation exceeds said predetermined tolerance.

3. The apparatus defined in claim 1 wherein the force measuring means includes a sensor which is mounted int eh stroke gear of the movable tool.

4. The apparatus defined in claim 1 including means for adjusting said predetermined value of said force.

5. The apparatus defined in claim 1 including means for adjusting the value of said predetermined tolerance.

6. The apparatus defined in claim 1 including means for indicating the desired value of said force and the actual value of said force and the length of the stroke.

7. The apparatus defined in claim 1 including a keypad for inputting the desired value of said force.

* * * * *